(12) United States Patent
Spicer et al.

(10) Patent No.: US 6,591,298 B1
(45) Date of Patent: Jul. 8, 2003

(54) METHOD AND SYSTEM FOR SCHEDULING MEASUREMENT OF SITE PERFORMANCE OVER THE INTERNET

(75) Inventors: Nicholas Spicer, Sunnyvale, CA (US); Ron Wolf, Palo Alto, CA (US); Eric Stokesberry, Mountain View, CA (US)

(73) Assignee: Keynote Systems, Inc., San Mateo, CA (US)

( * ) Notice: Subject to any disclaimer, the term of this patent is extended or adjusted under 35 U.S.C. 154(b) by 0 days.

(21) Appl. No.: 09/558,414

(22) Filed: Apr. 24, 2000

(51) Int. Cl.[7] ............................................. G06F 15/173
(52) U.S. Cl. ...................................... 709/224; 709/104
(58) Field of Search ............................... 709/104, 105, 709/106, 107, 224, 235, 241, 200; 707/200

(56) References Cited

U.S. PATENT DOCUMENTS

| | | | |
|---|---|---|---|
| 5,557,746 A | 9/1996 | Chen et al. | 395/200.06 |
| 5,657,450 A | 8/1997 | Rao et al. | 395/610 |
| 5,696,701 A | 12/1997 | Burgess et al. | 364/551.01 |
| 5,696,965 A | 12/1997 | Dedrick | 395/610 |
| 5,754,772 A | 5/1998 | Leaf | 395/200.33 |
| 5,761,486 A | 6/1998 | Watanabe et al. | 395/500 |
| 5,761,663 A | 6/1998 | Lagarde et al. | 707/10 |
| 5,774,670 A | 6/1998 | Montulli | 395/200.51 |
| 5,790,798 A | 8/1998 | Beckett, II et al. | 395/200.54 |
| 5,790,977 A | 8/1998 | Ezekiel | 702/122 |
| 5,796,633 A | 8/1998 | Burgess et al. | 364/551.01 |
| 5,796,952 A | 8/1998 | Davis et al. | 395/200.54 |
| 5,802,106 A | 9/1998 | Packer | 375/225 |
| 5,805,815 A | 9/1998 | Hill | 395/200.48 |
| 6,006,260 A | 12/1999 | Barrick, Jr. et al. | 709/224 |
| 6,076,113 A * | 6/2000 | Ramanathan et al. | 709/235 |
| 6,185,598 B1 * | 2/2001 | Farber et al. | 709/200 |
| 6,370,560 B1 * | 4/2002 | Robertazzi et al. | 709/105 |
| 6,393,433 B1 * | 5/2002 | Kalavade et al. | 707/200 |
| 6,463,454 B1 * | 10/2002 | Lumelsky et al. | 709/105 |
| 6,502,131 B1 * | 12/2002 | Vaid et al. | 709/224 |

OTHER PUBLICATIONS

Lewis et al., Cost impacts of real–time non–intrusive monitoring technology to real–time embedded systems, 1998, IEEE, vol.: 1, pp. A31–1–A31–8.*

Mostafa H. Ammarm One the performance of Protocols for collecting responses over a multiple–access channel, Feb. 1995, IEEE transactions on communications, vol. 43, pp. 412–420.*

* cited by examiner

*Primary Examiner*—Mark R. Powell
*Assistant Examiner*—Chau Nguyen
(74) *Attorney, Agent, or Firm*—Ritter, Lang & Kaplan LLP

(57) ABSTRACT

A method for scheduling performance measurements to be collected over a network, each measurement target having an associated measurement interval specifying an approximate time between measurements. The method includes identifying a cost for each target and sorting the targets into a plurality of time periods. Each period has approximately the same total cost of measurement targets. Targets having similar measurement intervals are grouped together within each of the time periods and assigned to a time range within the period. The method further includes sorting the measurement targets within each time range to provide a generally even load balance across the time range. A system for scheduling performance measurements is also disclosed.

20 Claims, 7 Drawing Sheets

METHOD AND SYSTEM FOR SCHEDULING MEASUREMENT OF SITE PERFORMANCE OVER THE INTERNET

BACKGROUND OF THE INVENTION

The present invention relates generally to evaluating quality of service provided over the Internet, and more particularly, to systems and methods for scheduling of service measurements over the Internet.

With the explosive growth of the Internet, increased traffic has caused the performance experienced by users making connections over the Internet to vary widely. The longer it takes a user to download information from a web site, the more likely the user is to go to a competitor's web site. Thus, it is important for companies to be aware of the amount of time it takes users to download information from their Internet sites so that they can quickly identify problems, upgrade their equipment, modify the content of their web site, or otherwise increase the speed of delivery of information at their web site.

Many factors influence the performance of a connection including the user's modem and other equipment, the type of server, the load on the server, and the Internet service provider used. The first step in evaluating connection performance is to obtain reliable information regarding performance characteristics such as the time required to download web pages or other information across a connection.

One approach to measuring web site performance is to connect measurement agents to the Internet at various geographic locations. This approach is described in U.S. Pat. No. 6,006,260, issued Dec. 21, 1999, by Barrick et al. The system disclosed therein uses a browser agent to send an HTTP GET command to a server and then record the amount of time it takes to complete transmission of the data. The agents evaluate the performance of a web site by measuring the amount of time it takes to download a web page at each location. Due to their remote location, the agents are able to evaluate the performance of a web site from the end user's perspective, and are able to measure the effects of the intervening network itself in addition to the performance of the web server. As a result, the performance seen by an agent can provide a reasonable approximation for the service experienced by customers connecting to the Internet at approximately the same location, and at approximately the same time as the agent.

The performance of a web site may be measured by multiple agents located at various locations and running the GET commands at different times. Measurements are preferably taken at specified intervals (e.g., one minute, fifteen minutes, one hour, etc.) throughout the day so that web site performance can be measured during peak web site usage as well as other times. Each agent may be required, for example, to take performance measurements over 250,000 times a day. If these performance measurements are not spread out appropriately (in accordance with their specified intervals), the data collected will not accurately reflect true download times. For example, if the agent runs a large number of HTTP GETS at one time, the performance measurements may be affected by the limited bandwidth of the agent's connection to the Internet. Similarly, if transactions requiring a large number of bytes to be downloaded are run close to the same time, the measurement may not reflect actual download times experienced by a user of the web site.

There is, therefore, a need for a method and system for scheduling performance measurements collected over a network by an agent, to provide a realistic measurement which is not biased by the number of measurements the agent is collecting or the bandwidth available to the agent at any particular time.

SUMMARY OF THE INVENTION

A method and system for scheduling performance measurements to be collected over a network are disclosed. Each measurement target has an associated measurement interval specifying an approximate time between measurements of the target.

A method of the present invention generally comprises identifying a cost for each target and sorting the targets into a plurality of time periods. Each period has approximately the same total cost of measurement targets. Targets having similar measurement intervals are grouped together within each of the time periods and each group is assigned to a time range within the period. The method further comprises sorting the measurement targets within each time range to provide a generally even load balance across the time range.

A system for scheduling performance measurements generally comprises a costing agent operable to identify a cost for each target and a scheduler operable to sort the measurement targets into a plurality of time periods. Each period has approximately the same total cost of measurements. Targets having similar measurement intervals are grouped together within each time period and assigned to a time range within the period. The targets are sorted by the scheduler within each time range to provide a generally even load balance across the time range.

In another aspect of the invention a computer program product schedules performance measurements to be collected over a network. The computer program generally comprises computer code that identifies a cost for each measurement and sorts the measurements into a plurality of time periods. The computer program product further includes computer code that groups together within a time period measurements having similar measurement intervals and assigns each group to a time range within the period. Computer code that sorts the measurements within each time range to provide a generally even load balance across the time range is also included. The computer program product further includes a computer readable medium that stores the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
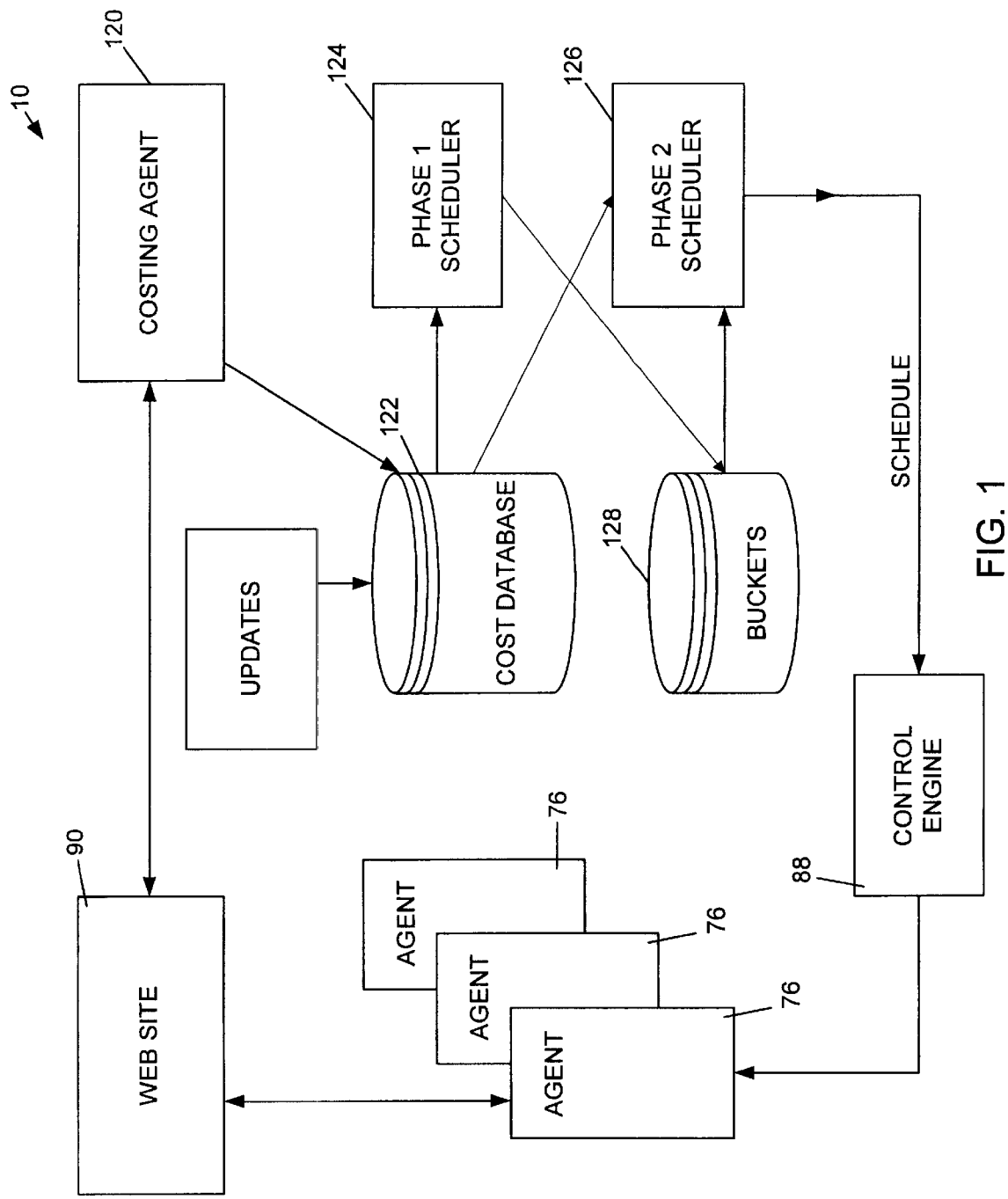
FIG. 1 is a block diagram of a system for scheduling performance measurements made by agents over a network.

Referring now to the drawings, and first to FIG. 1, a system for scheduling measurements for web site performance is schematically shown and generally indicated at 10. The measurement may be the time it takes to download a web page over the Internet, for example. Measurements are made to determine if users are receiving adequate performance and aid in debugging problems with a site when they occur. The measurements allow web site owners to monitor and optimize the performance of their web sites and manage the effect of content and back end applications by evaluating how long it takes to download a web page. The measurements may be used to detect problems with content, a web server, back end system, backbone, network, or combinations thereof. By breaking content download time into its constituent elements, the source of delays may be identified. Also, the geographic distribution of agents, allows for the identification of problems based on location. The measurement data gathered provides information about the relationship between web content and Internet network delays which may be used by web architects to optimize web page design. As further described below, the system 10 schedules the collection of performance measurement data by agents to prevent factors such as bandwidth of the agents or the number and size of measurements being collected by an agent from affecting measurement data.

The scheduling performed by system 10 is based on a cost function. The cost function may be used to schedule the measurements based on size or time (e.g., total download time or page delay time), for example. The cost function is preferably based on the size of the file or files to be downloaded. The cost may be defined, for example, as total bytes downloaded or time to first byte. The cost may also be based on peak bandwidth or a profile of bandwidth usage over time, for example.

Figure 2:
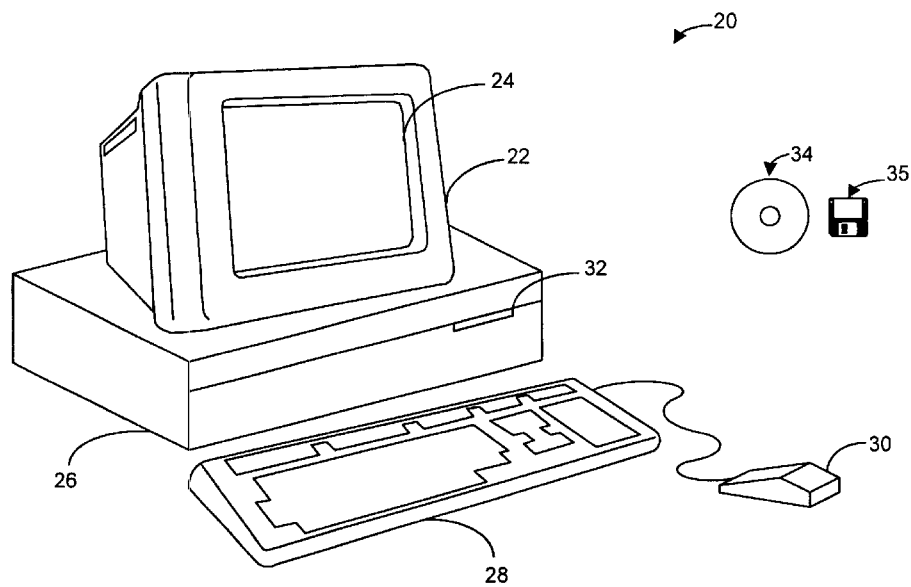
FIG. 2 is a schematic illustrating an example of a computer system that can be utilized to execute software of an embodiment of the invention.

FIG. 2 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 3) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 3:
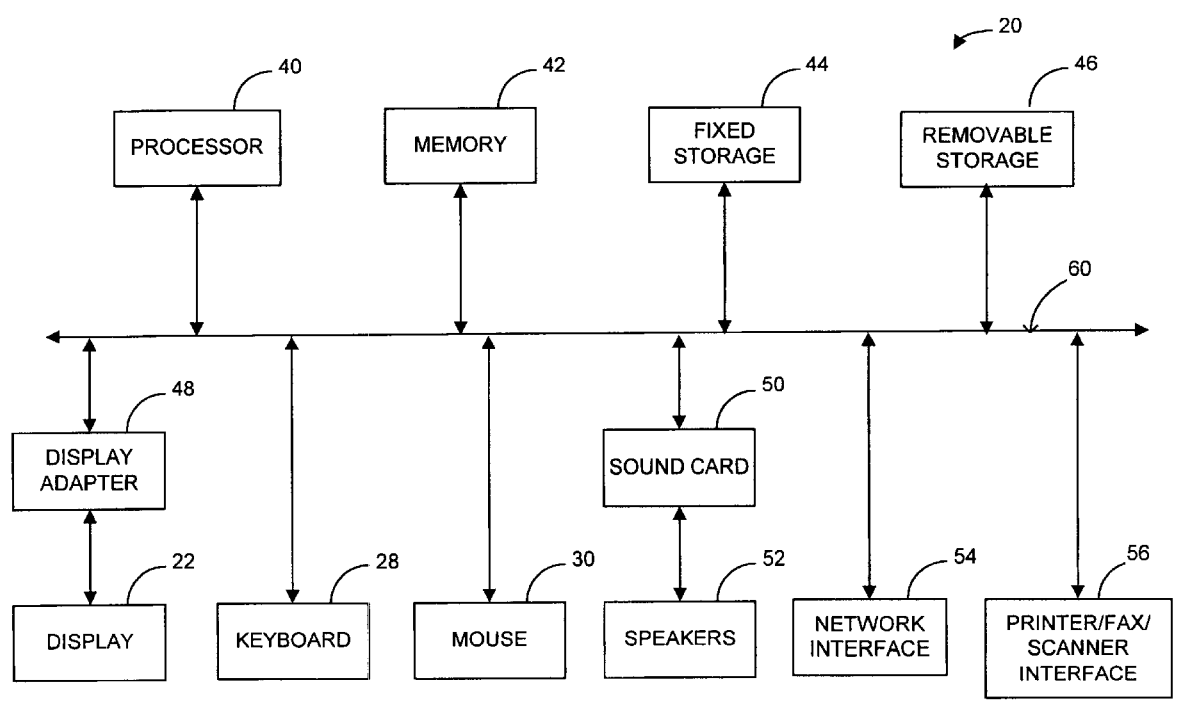
FIG. 3 is a system block diagram of the computer system of FIG. 2.

FIG. 3 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 3. However, these arrows are only illustrative of one possible interconnection scheme serving to link the subsystems. For example, a local bus could be utilized to connect the central processor 40 to the system memory 42 and display adapter 48. Computer system 20 shown in FIGS. 2 and 3 is but an example of a computer system suitable for use with the invention. Other computer architectures having different configurations of subsystems may also be utilized. For example, the agent computer systems typically do not include a display 22, screen 24, keyboard 28, or mouse 30.

Figure 4:
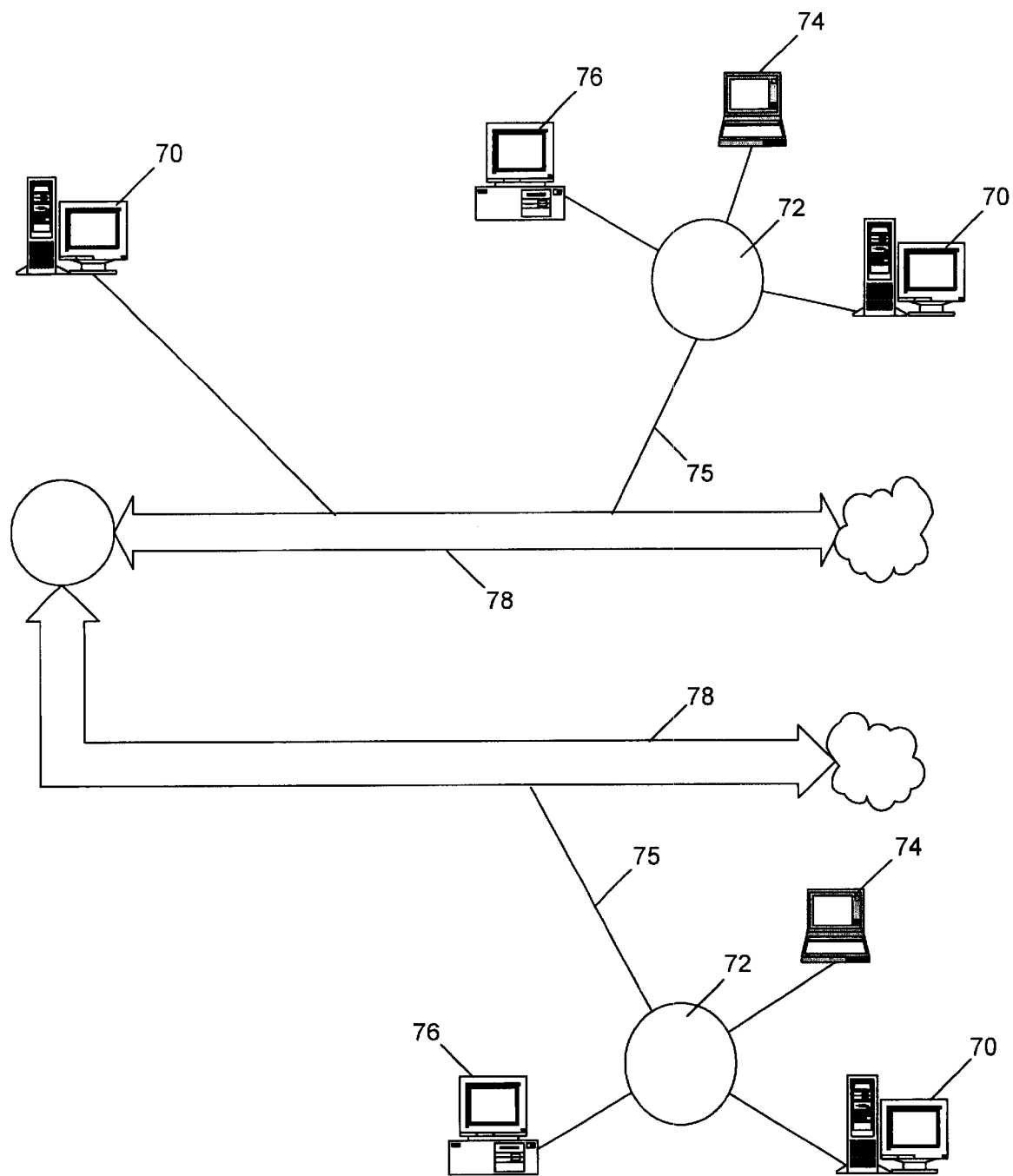
FIG. 4 is a schematic illustrating components within a network on which performance data can be collected.

As shown in FIG. 4, the performance measurements are collected on a network. In one embodiment, the network is the Internet and the information is transmitted in the form of web pages. FIG. 4 illustrates the interconnection between components within the network. The network includes one or more servers 70 for hosting one or more network sites. The servers 70 are typically connected to the network at points of presence (POPs) 72, established by network service providers at a variety of geographic locations. Also connected to the network via POPs 72 are multiple users 74 and data acquisition agents 76. Transmission media such as T1 and T3 lines, dial-up, DSL (Digital Subscriber Line), or cable connections may provide interconnections between the components within the network. A given geographic location, such as a metropolitan area, will typically contain multiple POPs 72 established by different network service providers. Each POP 72 may supply Internet connections to one or more users 74, servers 70, and agents 76. As illustrated in FIG. 4, the POPs 72 may be connected directly to an Internet backbone 78 via a relatively high-speed transmission medium 75 such as a T1 line. The connection between POPs 72, users 74, servers 70, and agents 76 may include any suitable transmission media, including, but not limited to, public telephone lines, T1 lines, T3 lines, and Ethernet connections.

It is to be understood that the network configuration and interconnections shown in FIG. 4 and described herein, are provided for purposes of illustration only. One of ordinary skill in the art will readily appreciate that the present invention may be practiced on networks more or less complex than that shown, in accordance with the teachings contained herein.

The agents 76 are configured to receive commands (e.g., specific URLs and instructions when to run or what order to run the performance measurements) from one or more external servers, automatically obtain web performance measurements, and send data to one or more databases and servers. The agents 76 repeatedly access many web sites 90, making repeated measurements and sending multiple reports to a data collection server. The agents 76 communicate the performance data that they have collected to the server via network connections and may forward the data to the server as soon as the data has been gathered, temporarily store the data before forwarding it to the server, or communicate data to the server in some other manner. The agents 76 may comprise Windows NT computers which are connected directly to POPs 72 at facilities throughout the network, for example. The agents 76 preferably include a processor and memory, which may include high speed random-access memory (RAM) and non-volatile-storage such as a magnetic disk and read only memory (ROM). It will be understood that the agents 76 may comprise any suitable device and may be located at various geographic locations, without departing from the scope of the invention. The agents may run on any type of Internet connections, such as T1 lines, dial-up, DSL, 56 Kb, or cable modem, for example. The agent may use an Internet browser such as Internet Explorer or Netscape or emulate a browser.

Figure 5:
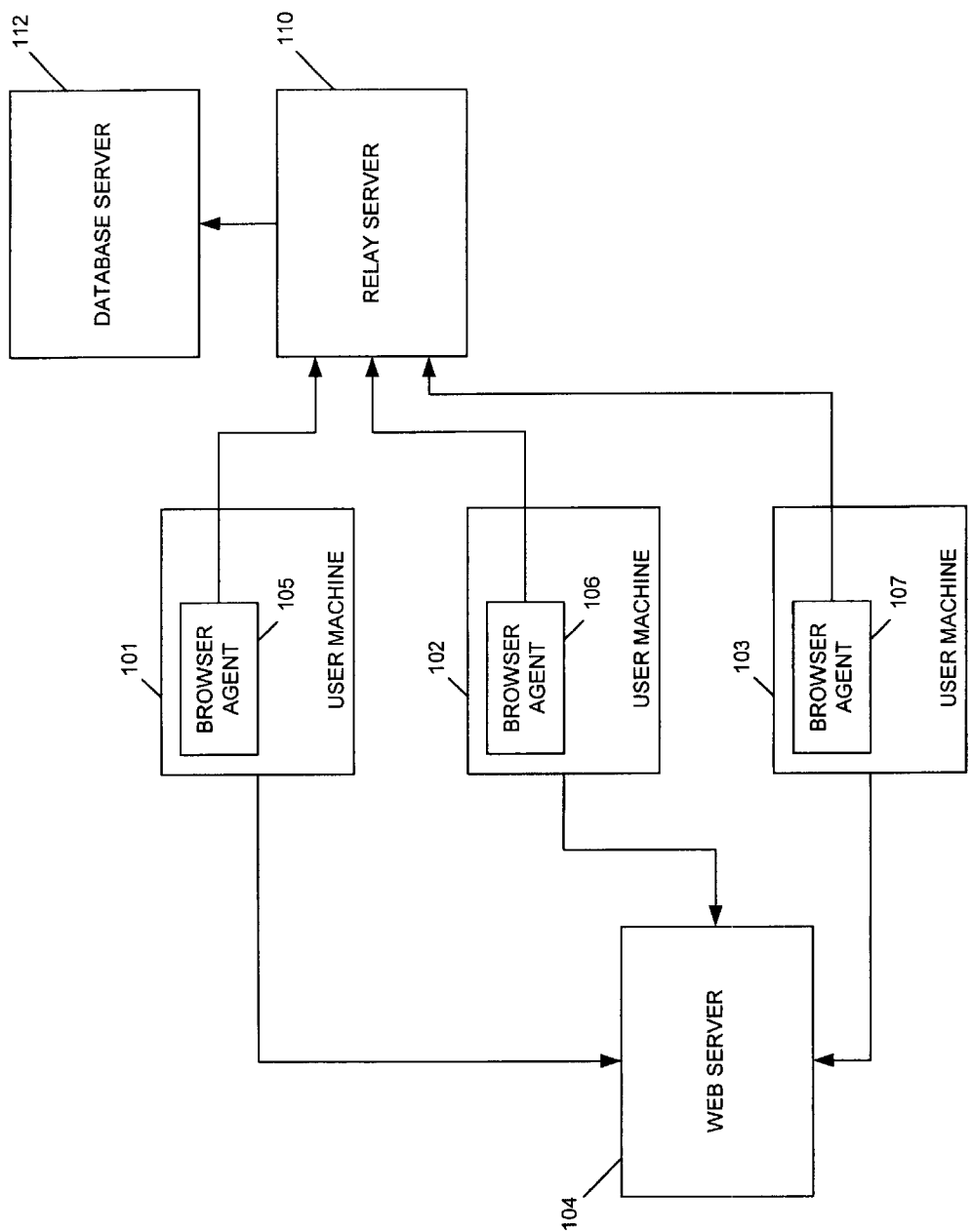
FIG. 5 a block diagram of a system for measuring download time of a web page at a group of client sites.

FIG. 5 is a block diagram illustrating an example of a system for measuring the download time of a web page at a group of client sites. A number of user machines 101, 102, and 103 are connected to a web server 104. Browser agents 105, 106, and 107 are shown implemented on each of the user machines 101, 102, 103. In one embodiment, each user machine 101, 102, 103 has a web browser application running on it that supports JavaScript and HTML frames. Browser agents may also be provided as part of an installed browser or a plug-in to a browser that is separately downloaded by a user.

In a preferred embodiment, the agents 76 obtain data from a server by sending an HTTP GET or POST request to the server and measuring how long it takes to download the requested information, starting from the time that the HTTP GET request was sent. When the user machine 101, 102, 103 sends an HTTP GET request to web server 104, the web server responds to the request by sending an HTML page that contains browser agent 105, 106, 107. Once the HTML page containing a browser agent is downloaded into a web browser running on a user machine 101, 102, 103 that supports JavaScript and HTML frames, the browser agent is used to measure web page download timing. Each browser agent 105, 106, 107 sends download timing information to a relay server 110 in the form of an HTTP GET request that is adapted to send data in a predefined format. Relay server 110 preferably transfers the data to a database server 112. In different embodiments, database server 112 is located at the site of the web page provider, at an Internet provider, or at the site of a download timing service center. In addition to providing download timing information, a browser agent can also provide certain geographical, configuration, or identification information about the user machine 101, 102, 103 on which it resides.

Additional details regarding the measurement of download timing by agents 76 may be found in U.S. Pat. No. 6,006,260, referenced above, which is incorporated herein by reference in its entirety. It is to be understood that any suitable method of measuring download times or other performance data with an agent may be used, without departing from the scope of the invention.

Referring again to FIG. 1, the scheduling system 10 includes a costing agent 120 which is used to gather information on the cost of each measurement target. The costing agent 120 receives data records identifying each target for which it is to obtain cost information and schedule performance measurements for one or more of the agents 76. For example, the costing agent 120 may receive a data record with the following fields identifying a measurement target.

TID: Target ID
TMI: Target Monitoring Interval
THN: Target Host Name
THP: Target Host Port Number
TDO: Target Descriptor (web page)
RBL: Byte Limit
FPM: Full Page Measurements
PRG: Cache Pages
UAG: User Agent The Target ID is a unique identifier assigned to each measurement target. The monitoring interval specifies the time between measurements of the target. For example, a target may be scheduled for measurement every minute, fifteen minutes, hour, week, or any other time interval. The host name, port number, and descriptor make up the URL which identifies the web page being measured. The byte limit specifies a number of bytes at which to stop the measurement. This is to prevent error and if more data than is expected for a specific URL is downloaded. The full page and component data fields are used to identify what level of performance measurements the agent 76 is to collect. If the full page data field is 0, the download time is measured for only the benchmark page (e.g., only one file). If this field is 1, the time to download the full web page including images and reference frames will be measured. The cache data field is used to identify whether PRAGMA NO CACHE is input into the HTTP request. If this is inserted into the request, caching rules are not used. The user agent field identifies the specific agents 76 that are to collect the performance measurements. After the measurement target is scheduled, the system 10 will insert a TIM field into the data record to specify a time that the target should be measured (e.g., number of one hundred thousandths seconds into an hour).

As previously described in the preferred embodiment, the cost of each measurement target is based on size (e.g., number of bytes downloaded). Thus, each measurement target has a corresponding cost. Each target also has an associated measurement interval which specifies an approximate time between measurements of the target. For example, a customer may want to measure the performance of his web site every fifteen minutes. The target may be measured at 1, 16, 31 and 46 minutes past the hour (within±one minute, for example). The measurement target will thus have a cost (e.g., number of bytes downloaded) and a measurement interval (i.e., time between measurements) associated with it.

The measurement intervals are preferably rounded to standard measurement frequencies. The standard measurement frequencies are a series of measurement frequency times, where all frequencies are integral divisors of the major cycle time (e.g., one hour) and each frequency is an integral divisor of all greater value frequencies. For example, the intervals 1 minute (60 seconds), 3 minutes (180 seconds), 15 minutes (900 seconds), 30 minutes (1800 seconds), and 60 minutes (3600 seconds) are all standard measurement frequencies for a major cycle frequency of one hour. Frequency intervals greater than sixty minutes are treated as sixty minutes. Frequencies under sixty minutes which are not one of the standard measurement frequencies are discarded and a warning is sent to the measurement collection center.

The costing agent 120 obtains cost information for each measurement target by requesting data such as a web page and measuring the number of bytes downloaded by the server at the web site 90. Once the costing agent 120 obtains cost information on the target, it transfers this information to a cost database 122. The cost database 122 provides this data to a scheduler. As shown in FIG. 1, the scheduler is split into a phase one scheduler 124 and a phase two scheduler 126.

The phase one scheduler 124 sorts the measurement targets by interval and size and attempts to provide an even distribution of target into groups. The groups may be, for example, sixty one-minute buckets 128 which together define a schedule for a one hour cycle. By allocating measurement targets into one-minute buckets, and using this repeatedly as the basis for further scheduling, gross movements of measurement periods for targets are avoided, since the scheduling of the target does not move from the one-minute bucket it is assigned to. The phase one scheduler 124 processes data gathered from the cost database 122 and assigns each measurement target to one of the sixty buckets 128. This is done in such a way as to ensure that each one-minute bucket has a comparable cost to the other fifty-nine buckets. For example, the targets having one minute intervals are first placed into each of the one-minute buckets so that the measurement is taken every minute. The three minute targets are next placed into one out of every three buckets. Once the first bucket is selected, insertion of the same target into the other buckets is automatic. For example, a fifteen minute cycle target is inserted into the best fit minute bucket within the first fifteen buckets and then positioned identically in the four remaining sets of fifteen buckets. Where there is a choice of buckets, the bucket with the lowest number or smallest cost of measurements is selected. Targets having the same measurement interval are preferably assigned to the buckets 128 in an order going from the largest size target to the smallest size target. This helps to spread the cost evenly among the sixty buckets. This process continues until are targets are placed in one or more buckets. The result is sixty buckets, each containing targets having approximately the same total cost.

Phase one scheduling is preferably performed infrequently (e.g., once a week). If the phase one scheduling is performed frequently, the measurement intervals may vary due to shifting targets between buckets. If new targets are added between phase one scheduling, they are load balanced with the existing targets during phase two scheduling, as further described below.

The phase two scheduler 126 processes the results of the phase one scheduler and may be run at any time to include new targets that have not been processed by the phase one scheduler or remove old targets. Also, targets with "exceptional" measurement cycles are passed through for processing by the phase 2 scheduler 126 without bucket allocation. Exception intervals include 5 minutes (300 seconds), 10 minutes (600 seconds), and 20 minutes (1200 seconds) measurement frequencies, for example. When the phase two scheduler 126 receives a target with no previous bucket scheduling, it performs minute bucket scheduling for the target and then proceeds with the phase two scheduling. Phase two scheduler 126 preferably runs on demand to update the schedules delivered to agents 76. This ensures that additions and deletions to the set of measurement targets assigned to the buckets 128, between phase one and phase two scheduling, do not cause a significant drift in the measurement cycle time.

The phase two scheduler 126 queries the buckets 128 for measurements assigned to specific agents 76 and performs sub-minute scheduling for each of the sixty one-minute buckets. The phase two scheduler 126 sorts the targets within each one-minute bucket 128 to keep large cost targets separated from one another. The phase two scheduler 126 also sorts between buckets 128 so that a large target does not run at the end of a one-minute bucket with another large target running at the beginning of the next one-minute bucket.

Figure 6:
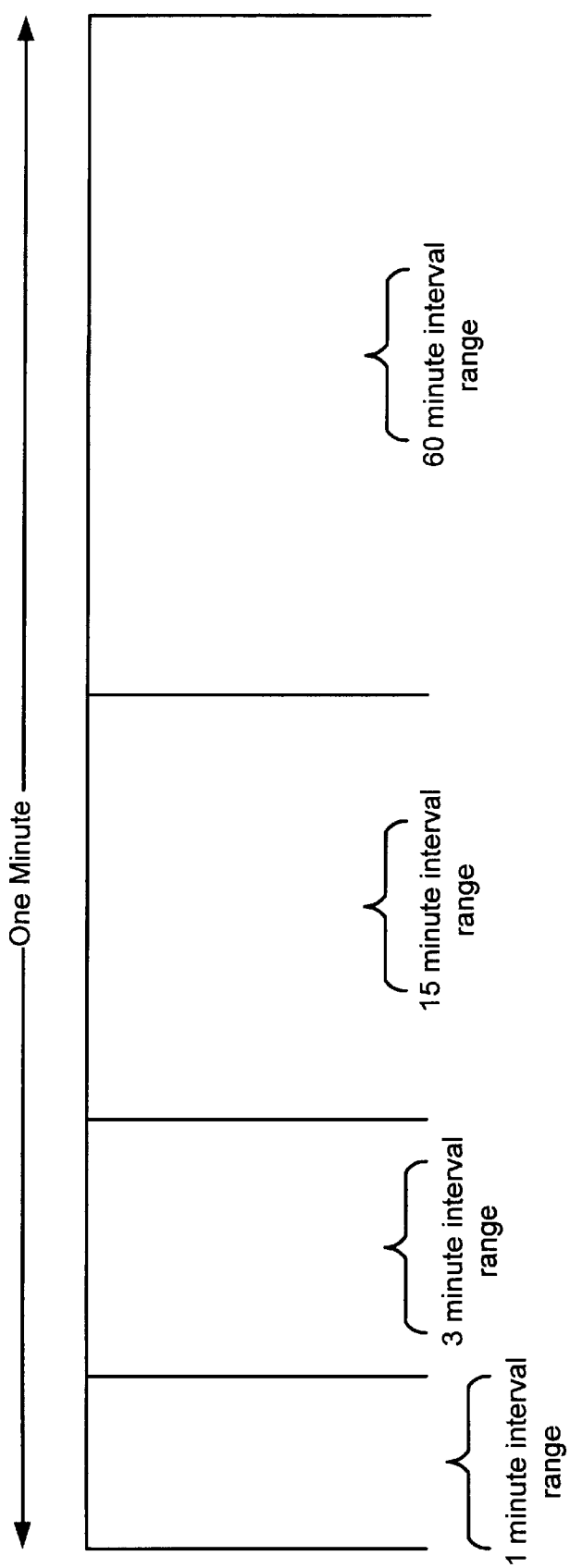
FIG. 6 is a schematic illustrating a breakdown of a one minute time period into a plurality of interval time ranges.

The phase two scheduler 126 first groups targets having the same or similar measurement intervals together and assigns each interval group to a time range of one or more seconds within the one minute time period. As shown in FIG. 6, all targets having a one minute measurement interval are grouped together, targets having a three minute interval are grouped together, targets having a fifteen minute interval are grouped together, etc. The number of seconds allocated to each range is preferably calculated as the ratio of cost of targets within an interval group to the total cost of all targets within the minute bucket. For example, if the cumulative size of all targets having a fifteen minute interval is 10,000 bytes and the total cost of all targets within the bucket is 500,000 bytes, the ratio is 0.02. Thus, the targets having a fifteen minute interval will be assigned to a time range of 1.2 seconds. The intervals are preferably positioned in the same order in each bucket (e.g., one minute interval, three minute interval, fifteen minute interval, sixty minute interval). This is done to ensure that measurements do not drift significantly off their stated measurement intervals, especially as new targets are introduced or existing targets are removed after the phase one scheduling. The maximum drift is thus dictated by twice the allotment of time a particular measurement interval has within a minute.

In phase two scheduling, the targets are first ordered within the range of seconds according to their effect on the range, to achieve load balancing within the range. As further described below, this load balancing takes into account the fact that the measurement will impact more than a single second, since the web site does not download instantaneously.

Figure 7:
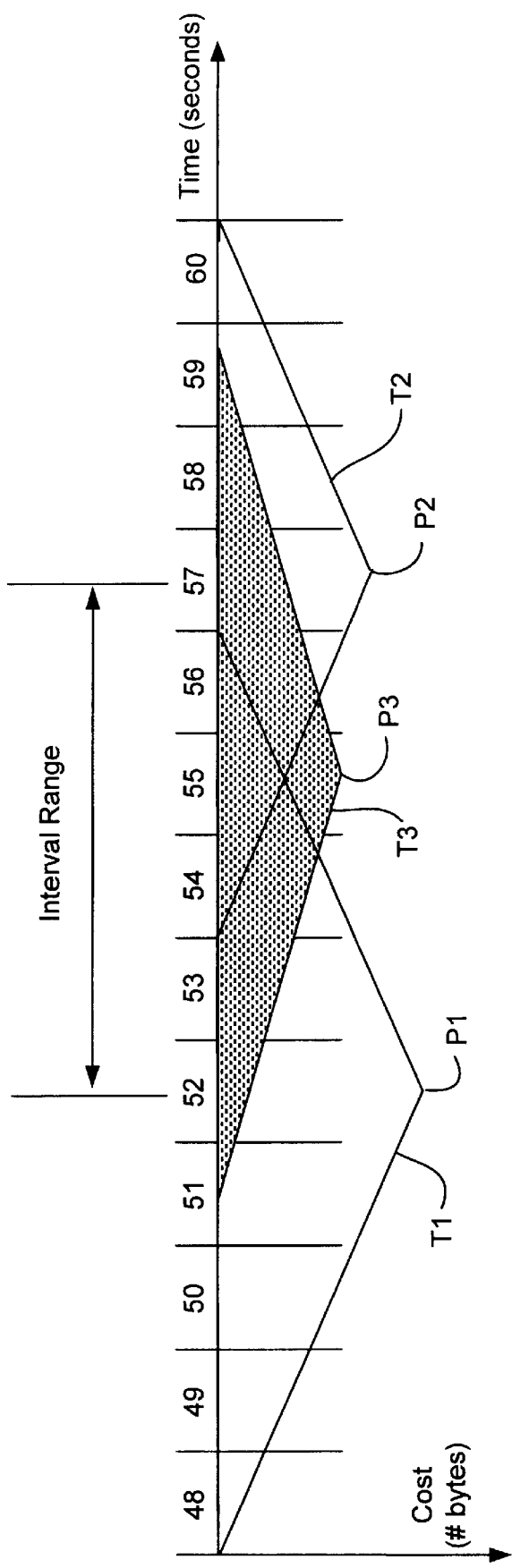
FIG. 7 is a graph of time versus cost illustrating one step of a scheduling process of the present invention.

After the targets are placed within their respective interval range, the targets within each range are sorted. The targets are first sorted in order of cost, from greatest number of bytes to smallest number of bytes. The largest target is then assigned a measurement point (i.e., second within the range) when the agent 76 will start the measurement. FIG. 7 is a graph of time versus cost and illustrates the positioning of three targets T1, T2, T3 within a five second interval range extending from the $52^{nd}$ second to the $57^{th}$ second of a one-minute bucket. The first target T1 is positioned within the first second in the interval range (i.e., $52^{nd}$ second) at measurement point P1. After the target T1 is positioned, cost is added after the measurement point P1 to account for an estimated download period and before the measurement point, so that the measurement load is visible as a near future event. The cost added before the measurement point P1 prevents another large target from being scheduled immediately before the scheduled target T1. As shown in FIG. 7, the cost effects reduce as they gain distance from the actual measurement point P1. Thus, the cost profile is shaped as a triangle or pyramid. In the preferred embodiment the cost may be spread to cover, for example, six seconds before the measurement point and six seconds after the measurement point. This "width" parameter may vary between scheduling or even between targets. The next largest target T2 is then positioned within the interval range such that a minimum amount of overlap is created between the first and second targets T1, T2. The third target T3 is positioned at point P3 in between the measurement points P1, P2 (peaks) of the first two targets T1, T2 at a point of minimum cost to provide load balancing between the three targets.

The above described "pyramid" scheduling provides a scheduling order of the targets within their interval time range. The targets may be scheduled according to the location determined by the pyramid scheduling or simply spaced evenly from one another within the time range. The spacing of targets by the pyramid scheduling method allocates the time period of the range so that the time between one measurement and the next is dictated by the cost of adjacent measurements. Thus, a large cost measurement delays the start of the following measurement more than a lower cost measurement. A preferred method for spacing the targets is to provide a uniform gap between each measurement. The length of the time range is divided by the number of targets within the time range. For example, as shown in FIG. 7, three targets are scheduled within five seconds, thus, each target will be positioned approximately 1.6 seconds apart. The targets may also be positioned based on a ratio of their cost to the total cost of all targets within the time range.

Figure 8:
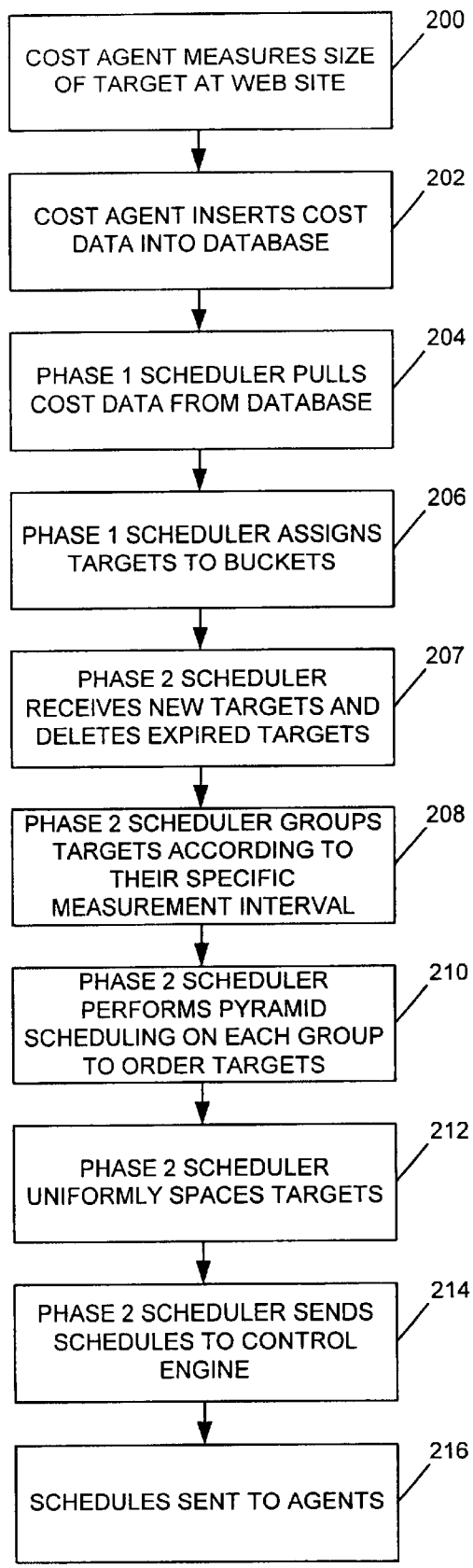
FIG. 8 is a process flowchart illustrating a process for scheduling measurements of web site performance.

FIG. 8 is a flowchart illustrating a process for scheduling measurement targets. At step 200 the costing agent 120 measures the size of each target by requesting a web page and measuring the number of bytes downloaded. The costing agent 120 inserts this cost data into the database 122 (step 202). The phase one scheduler 124 pulls this cost data from the database 122 at weekly intervals (step 204) and assigns targets to one-minute buckets 128 (step 206). The phase two scheduler 126 then gathers data from the buckets and schedules the targets within each bucket. The phase two scheduler also receives new targets and deletes expired targets (step 207). The phase two scheduler 126 first groups targets according their measurement interval and places each group into a time range defined by a ratio of cost of targets within time range to total cost of targets within the bucket (step 208). The phase two scheduler 126 next orders the targets within each time range using pyramid scheduling to provide load balancing within each time range (step 210). The targets are then uniformly spaced from one another (step 212). The schedules for each agent are sent to the control engine 88 from the phase two scheduler 126 (step 214) and the agents 76 pull schedules from the control engine (step 216). Preferably, the agents 76 request a new schedule from the control engine 88 at specified intervals (e.g., every hour). The agents may also be directed to request a new schedule at other times including at start up.

A method and system for scheduling performance measurements over the Internet have been disclosed. The method system disclosed may also be applied to other network computing environments, including public or private Internets or Intranets. Download time, or any other performance parameters that are desired, may be measured using an agent that monitors information as it is transmitted between parties. The measured performance may be for the download time of a single web site, for example.

Although the present invention has been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method for scheduling performance measurements to be collected over a network, each measurement target having an associated measurement interval specifying an approximate time between measurements of the target, the method comprising:

identifying a cost for each target;

sorting the targets into a plurality of time periods, each period having approximately the same total cost of measurement targets;

grouping together within each of said time periods, targets having similar measurement intervals and assigning each group to a time range within the period; and sorting the measurement targets within each time range to provide a generally even load balance across the time range.

2. The method of claim 1 wherein identifying a cost for each target comprises measuring the amount of data downloaded in response to a request for data over the network.

3. The method of claim 2 wherein measuring the amount of data downloaded comprises sending a request for data over the network, loading data responsive to the request, and counting number of bytes downloaded.

4. The method of claim 3 wherein the network is the Internet and the request for information comprises requesting a web page.

5. The method of claim 1 wherein sorting the targets within each time range comprises selecting a measurement time for each target and spreading the measurement cost across multiple seconds before and after the measurement time.

6. The method of claim 5 wherein sorting the targets within each time range further comprises positioning the measurement times to reduce overlap between measurement targets.

7. The method of claim 5 wherein spreading the cost across multiple seconds within the time range comprises extending the cost to six seconds prior to the measurement time and six seconds after the measurement time with the cost reducing to zero as it reaches ends of the spread.

8. The method of claim 1 wherein each time period is approximately one minute.

9. The method of claim 1 further comprising sending a schedule of measurement targets to a plurality of data acquisition agents at a plurality of locations.

10. The method of claim 9 wherein the performance measurement is a time for loading a web page at the data acquisition agent.

11. The method of claim 1 further comprising defining each of said time ranges by calculating a ratio of cost of targets within said time range to a total cost of all targets within said time period.

12. A system for scheduling performance measurements over a network, each measurement target having an associated measurement interval specifying an approximate time between measurements, the system comprising:

a costing agent operable to identify a cost for each target; and a scheduler operable to sort the measurement targets into a plurality of time periods, each period having approximately the same total cost of measurements, group together within each time period targets having similar measurement intervals, assign each group to a time range within the period, and sort the targets within each time range to provide a generally even load balance across the time range.

13. The system of claim 12 wherein said cost is based on a size of data downloaded in response to a request for data over the network.

14. The system of claim 12 further comprising a data acquisition agent connected to the network and operable to collect performance measurements for the targets according to a schedule received from the scheduler.

15. The system of claim 12 wherein the scheduler is operable to vary scheduling parameters.

16. A computer program product for scheduling performance measurements to be collected over a network, each measurement having an associated measurement interval specifying an approximate time between measurements, comprising:

computer code that identifies a cost for each measurement;

computer code that sorts the measurements into a plurality of time periods, each period having approximately the same total cost of measurements;

computer code that groups together within each time period, measurements having similar measurement intervals and assigning each group to a time range within the period;

computer code that sorts the measurements within each time range to provide a generally even load balance across the time range; and a computer readable medium that stores said computer codes.

17. The computer program product of claim 16, wherein the computer readable medium is selected from the group consisting of CD-ROM, floppy disk, tape, flash memory, system memory, hard drive, and a data signal embodied in a carrier wave.

18. The computer program product of claim 16 wherein the computer code that identifies cost comprises computer code that measures the number of bytes downloaded in response to a request for data over the network.

19. The computer program product of claim 16 further comprising computer code that selects a measurement time for each measurement target and spreads the cost across multiple seconds around the measurement time.

20. The computer program product of claim 16 further comprising computer code that positions the measurement times to reduce overlap time between measurements.

* * * * *